Morrison & Harns,
Hanging Saw.

No. 101,492. Patented Apr. 5, 1870.

Witnesses:
A Bennemendorf
L. S. Mabee

Inventor:
L. Morrison
A. G. Harns
per Munn & Co
Attorneys.

United States Patent Office.

LAWRENCE MORRISON AND AMOS G. HARMS, OF ALLEGHENY CITY, PENNSYLVANIA.

Letters Patent No. 101,492, dated April 5, 1870.

IMPROVEMENT IN SAW-HANGING.

The Schedule referred to in these Letters Patent and making part of the same.

*To all whom it may concern:*

Be it known that we, LAWRENCE MORRISON and AMOS G. HARMS, of Allegheny City, in the county of Allegheny and State of Pennsylvania, have invented a new and useful Improvement in Saw Pitman-Head; and we do hereby declare that the following is a full, clear, and exact description thereof, which will enable others skilled in the art to make and use the same, reference being had to the accompanying drawings forming part of this specification.

This invention relates to muley-saw hangings, and consists in an improvement which will be specified hereinafter.

In the accompanying drawing—

Similar letters of reference indicate corresponding parts.

A represents the pitman-head.

B B are the pitman-head wrist-pins.

These pins are attached to the inner jaws C C, but they pass through slots in the outer jaws, so that they are allowed to move up or down when the adjustment is made.

Figure 2:
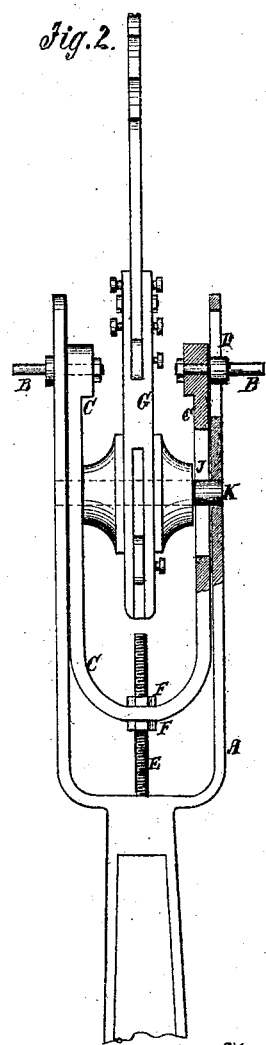
Figure 2 is a front view of the same, also partly in section.

The slot in one of the outside jaws is seen at D, fig. 2.

E is the adjusting-screw, which is provided with nuts F F, between which nuts the bow of the jaws C C is placed, as seen in the drawing.

By the adjustment, which may be made by means of the screw and nuts, the saw may be given more or less of an oscillating motion, as may be desired.

Figure 1:
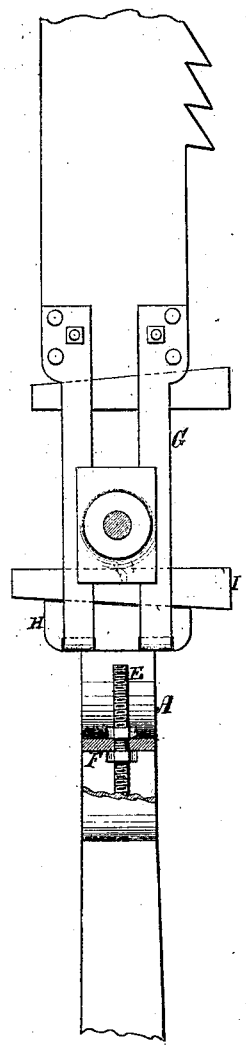
Figure 1 is a sectional side view of the arrangement, showing a portion of the saw and of the pitman.

G is the saw-buckle, the lower portion of which is made open, and provided with a gib, H, and key I, as seen in fig. 1.

By making the lower end of the buckle open in this manner, it will be seen that the saw may be removed from the pitman-head without disconnecting the buckle.

The inner jaws C are slotted, as seen at J, so that the wrist-pins of the pitman-head may be adjusted without disturbing the saw-buckle wrist-pin K.

By these improvements, the action of the saw (as regards its oscillation) may be governed with the greatest nicety, while the trouble and difficulty of disconnecting it from the pitman-head are avoided.

Having thus described our invention,

We claim as new and desire to secure by Letters Patent—

In combination with the pitman-head of a muley saw, the inner jaws C C, screw E, and nuts F F, by means of which the wrist-pins of the pitman-head are adjusted, substantially as and for the purposes described.

L. MORRISON.
A. G. HARMS.

Witnesses:
M. C. BRYANT,
A. M. CALLUM.